United States Patent
Ogunyoku et al.

(10) Patent No.: US 10,074,368 B2
(45) Date of Patent: Sep. 11, 2018

(54) PERSONALIZED SITUATION AWARENESS USING HUMAN EMOTIONS AND INCIDENT PROPERTIES

(71) Applicant: INTERNATIONAL BUSINESS MACHINES CORPORATION, Armonk, NY (US)

(72) Inventors: Temitope Ogunyoku, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/239,156

(22) Filed: Aug. 17, 2016

(65) Prior Publication Data

US 2018/0053503 A1 Feb. 22, 2018

(51) Int. Cl.

| | | |
|---|---|---|
| *G10L 21/00* | (2013.01) | |
| *G10L 17/00* | (2013.01) | |
| *G10L 15/22* | (2006.01) | |
| *H04W 4/22* | (2009.01) | |
| *G10L 25/63* | (2013.01) | |
| *G10L 15/18* | (2013.01) | |
| *G08B 21/18* | (2006.01) | |
| *H04W 4/90* | (2018.01) | |

(52) U.S. Cl.
CPC .............. *G10L 15/22* (2013.01); *G08B 21/18* (2013.01); *G10L 15/18* (2013.01); *G10L 25/63* (2013.01); *H04W 4/22* (2013.01); *H04W 4/90* (2018.02); *G10L 2015/227* (2013.01)

(58) Field of Classification Search
None
See application file for complete search history.

(56) References Cited

U.S. PATENT DOCUMENTS

| | | | |
|---|---|---|---|
| 6,910,050 B2 * | 6/2005 | Pawlick | A01K 11/008 379/67.1 |
| 7,379,879 B1 | 5/2008 | Sloo | |
| 8,002,701 B2 * | 8/2011 | John | A61B 5/0031 128/903 |

(Continued)

FOREIGN PATENT DOCUMENTS

CN 104598913 A 5/2015

OTHER PUBLICATIONS

Wikipedia, Lux, downloaded Mar. 25, 2018 from https://en.wikipedia.org/wiki/Lux, pp. 1-7.

(Continued)

*Primary Examiner* — Satwant Singh
(74) *Attorney, Agent, or Firm* — Otterstedt, Ellenbogen & Kammer, LLP

(57) ABSTRACT

The disclosure provides systems and methods for generating and delivering situational-dependent incident responses. An incident response is generated based on incident characterizations as well as emotional data pertaining to a reporting person. The generated response may also involve an interactive component in order to obtain further situational details from the reporting person and other sources, thereby further refine the response and recommendations. Persons reporting incidents are aided by appropriate recommendations and assistance from appropriate service providers.

20 Claims, 6 Drawing Sheets

(56) References Cited

U.S. PATENT DOCUMENTS

| | | | |
|---|---|---|---|
| 8,166,109 B2 * | 4/2012 | Lee | G10L 15/22 |
| | | | 379/88.02 |
| 8,463,606 B2 * | 6/2013 | Scott | H04M 3/42221 |
| | | | 379/88.03 |
| 8,825,479 B2 | 9/2014 | Krishnan et al. | |
| 9,071,579 B1 * | 6/2015 | Bender | H04L 63/0428 |
| 9,105,042 B2 * | 8/2015 | Sylves | G06Q 30/0201 |
| 9,124,697 B2 * | 9/2015 | Scott | H04M 3/42221 |
| 9,612,654 B2 * | 4/2017 | Brokken | G06F 3/011 |
| 2002/0116247 A1 | 8/2002 | Tucker et al. | |
| 2007/0066916 A1 | 3/2007 | Lemos | |
| 2011/0130636 A1 * | 6/2011 | Daniel | G08B 25/016 |
| | | | 600/301 |
| 2011/0260855 A1 * | 10/2011 | John | A61B 5/0031 |
| | | | 340/539.12 |
| 2011/0299666 A1 | 12/2011 | Hulls | |
| 2013/0237869 A1 * | 9/2013 | John | A61B 5/0031 |
| | | | 600/509 |
| 2013/0325943 A1 | 12/2013 | Al-Harthi | |
| 2014/0218187 A1 | 8/2014 | Chun et al. | |
| 2014/0287387 A1 | 9/2014 | Vukasinovic et al. | |
| 2015/0179038 A1 * | 6/2015 | Daniel | G08B 25/016 |
| | | | 340/870.07 |
| 2015/0373196 A1 * | 12/2015 | Scott | H04M 3/42221 |
| | | | 704/235 |
| 2016/0351074 A1 * | 12/2016 | Paul | A61B 5/7264 |
| 2017/0084295 A1 * | 3/2017 | Tsiartas | G10L 25/63 |

OTHER PUBLICATIONS

University of Liverpool, The parameters of eye movement, downloaded Mar. 25, 2018 from https://www.liverpool.ac.uk/~pcknox/teaching/Eymovs/params.htm, pp. 1-4.

* cited by examiner

PERSONALIZED SITUATION AWARENESS USING HUMAN EMOTIONS AND INCIDENT PROPERTIES

FIELD OF THE INVENTION

In embodiments, the technical field of the invention is methods and systems for generating situational-dependent incident responses.

BACKGROUND

Incidents such as vehicle accidents and fires are traumatic experiences for any person observing or involved in such incidents. A person's emotional state varies while observing and reporting an incident. For example, emotions such as panic, sad, traumatized, disgusted, annoyed, etc, may cloud a person's judgment, and cause heightened sensitivity. Incidents reported under such circumstances may lack fine-granular truth.

Emergency response aids and systems that generate emergency response plans may be aided by knowing and understanding the status of a reporting person's emotional status, but such data is not typically systematically collected or processed.

Existing response plan generating systems mainly focus on: real-time incident management and resources mapping to enable incident response team to view and allocate resources accordingly; toolsets to identify and track incidents in real-time, recognize the perimeter risk tolerance, and to allocate resources or personnel as needed; and Notification/alert system to share and communicate incident information for evacuation, etc. These systems could be vastly improved with more fine-grained detail about the emotional state of reporting persons.

SUMMARY OF THE INVENTION

A goal of this invention is to dynamically measure the emotional state and context of a human using sensory data from a mobile phone or other device while reporting an incident. Based on the computed emotional state, context and incident properties, determine the type of situation awareness advisory dialog services that are most appropriate, and determine inquiries for further fact finding about the incident and context.

Challenges overcome by the current invention include, in various embodiments, one or more of the following: generating personalized situation awareness for a person based on accurate determination of the emotional impact (affective/cognitive state) of the user, user interaction model, and characteristics of the incident; determining the emotional impact based on affective and cognitive level of the said subject using various mobile sensory data in real time; determination of the validity of the reported incident using the user emotional state; generating situation awareness services (e.g. risk avoidance, protection plan, first aid response, virtual walk-through in the form of a journey map directing to risk or incident free route) targeted to the user or users; and generating metaphors of the situation awareness to further contextualize personalized services using context and user interaction (text or voice) patterns.

Previous approaches generally fail to considers the emotional state, context and incident characteristics/risk to determine the type of situation awareness advisory services and determine Q&As for further fact finding about an incident. The disclosed invention, methods, and processes involve novel methods to aggregate multiple sensory data to measure the emotional state of the user (detection of affective and cognitive factors) from text, speech, image and video (among other) sensor data to be used for situation awareness services and to gather fine-grained facts about reported incident, by correlating with distributed reports and other data sources for further optimal response plan generation.

In an aspect, then, is a method comprising: receiving, by a system, an incident report from a user device, the incident report pertaining to an incident involving a target; receiving by the system an emotional data pertaining to a reporting person using the user device; processing the emotional data to determine an emotional status of the reporting person; processing the incident report to determine an incident type, incident category, and incident characteristic; and transmitting an initiation dialog sequence to the user device, the initiation dialog sequence configured to initiate on the user device a cognitive dialog module that prompts a further interaction with the reporting person, wherein the initiation dialog sequence is based at least in part on the emotional status of the reporting person and at least in part on the incident characteristics. In embodiments:

each receiving by the system is via a data network, radio, or other appropriate communication system, such communication system include an appropriate interface to enable the system to access the communication system;

each receiving by the system is via a data network, radio, or other appropriate communication system, and the same data network, radio, or other communication system is used for receipt by the system of the incident report as well as the emotional data;

each receiving by the system is via a data network, radio, or other appropriate communication system, and wherein different networks, radio, or other communication systems are used for receipt by the system of the incident report and the emotional data.

the method further comprises initiating a visible or audible alert on an emergency service provider device based at least in part on the processed incident report and at least in part on the emotional data;

the method further comprises altering a display on a dashboard of the system based on the incident report and the emotional data;

the emotional data is sensor data obtained from a sensor on the user device;

the emotional data is sensor data obtained from a plurality of sensors on the user device;

the method further comprises receiving by the system situation data pertaining to the incident, wherein the initiation dialog sequence is further based on the situation data;

the method further comprises receiving by the system situation data pertaining to the incident, wherein the situation data is from a source selected from the user device (via a network, radio, or other communication system) and an external source (via a network or radio or TV communication system);

the method further comprises receiving by the system situation data pertaining to the incident, wherein the situation data is from a source selected from the user device and an external source selected from police reports, social media, and radio bulletins;

the further interaction is selected from an audio interaction, a text interaction, a visual interaction, a gesture interaction, and a combination thereof;

the further interaction is selected from an audio interaction, a text interaction, a visual interaction, a gesture interaction, and a combination thereof, wherein the interaction involves a question and answer session;

the initiation dialog sequence is further based on identity data of the reporting person;

the method further comprises initiating the cognitive dialog module on the user device based on the initiation dialog sequence or based on an interaction pattern of the reporting person;

the method further comprises: initiating the cognitive dialog module on the user device based on the initiation dialog sequence; receiving, by the cognitive dialog module, additional data selected from further emotional data pertaining to the reporting person and situation data; and customizing the further interaction based on the additional data;

the further interaction comprises communication of data and instructions with the system to further customize the further interaction; and the further interaction comprises communication of data and instructions with the system to further customize the further interaction, wherein the further interaction is dialog.

In an aspect is a system comprising: a processor; and a memory coupled to the processor, the memory configured to store program instructions for instructing the processor to carry out the method as above. In embodiments:

the system comprises: a reasoning module; and an advisory module;

the system comprises a communications module for communicating via a network with a cognitive dialog module on a user device;

the system comprises a communications module for communicating via a network with a cognitive dialog module on a user device, the cognitive dialog module comprising a natural language processing (NLP) visual analytics software utility configured to analyze input from the reporting person (e.g. text, voice, image/video) and determine a response based on the input;

the system comprises a communications module for communicating via a network with a cognitive dialog module on a user device, the cognitive dialog module comprising a linguistics analyzer component configured to process the language, dialect, or slang of the reporting person; and the system further comprises both the NLP and linguistics modules communicate with the metaphor mapping engine to further contextual the dialog interaction or conversation.

In an aspect is a method comprising: processing an incident report received from a user device, the incident report pertaining to an incident involving a target; processing an emotional data received from the user device, the emotional data pertaining to a reporting person; and initiating on the user device a cognitive dialog module that prompts a further interaction with the reporting person, the further interaction based on the emotional data and incident report. In embodiments:

the further interaction is a component of an appropriate response determined based on the emotional data and incident report;

the method further comprises determining an emotional status of the reporting person based on the emotional data, and determining an incident category based on the incident report;

the emotional data is sensor data obtained from a sensor on the user device; and the further interaction is a component of an appropriate response determined based on the emotional data and incident report, and wherein the appropriate response is iteratively updated based on data obtained via the further interaction.

In an aspect is a system comprising: a processor; and a memory coupled to the processor, the memory configured to store program instructions for instructing the processor to carry out the method as above.

These and other aspects of the invention will be apparent to one of skill in the art from the description provided herein, including the examples and claims.

DETAILED DESCRIPTION OF VARIOUS EMBODIMENTS

Figure 1:
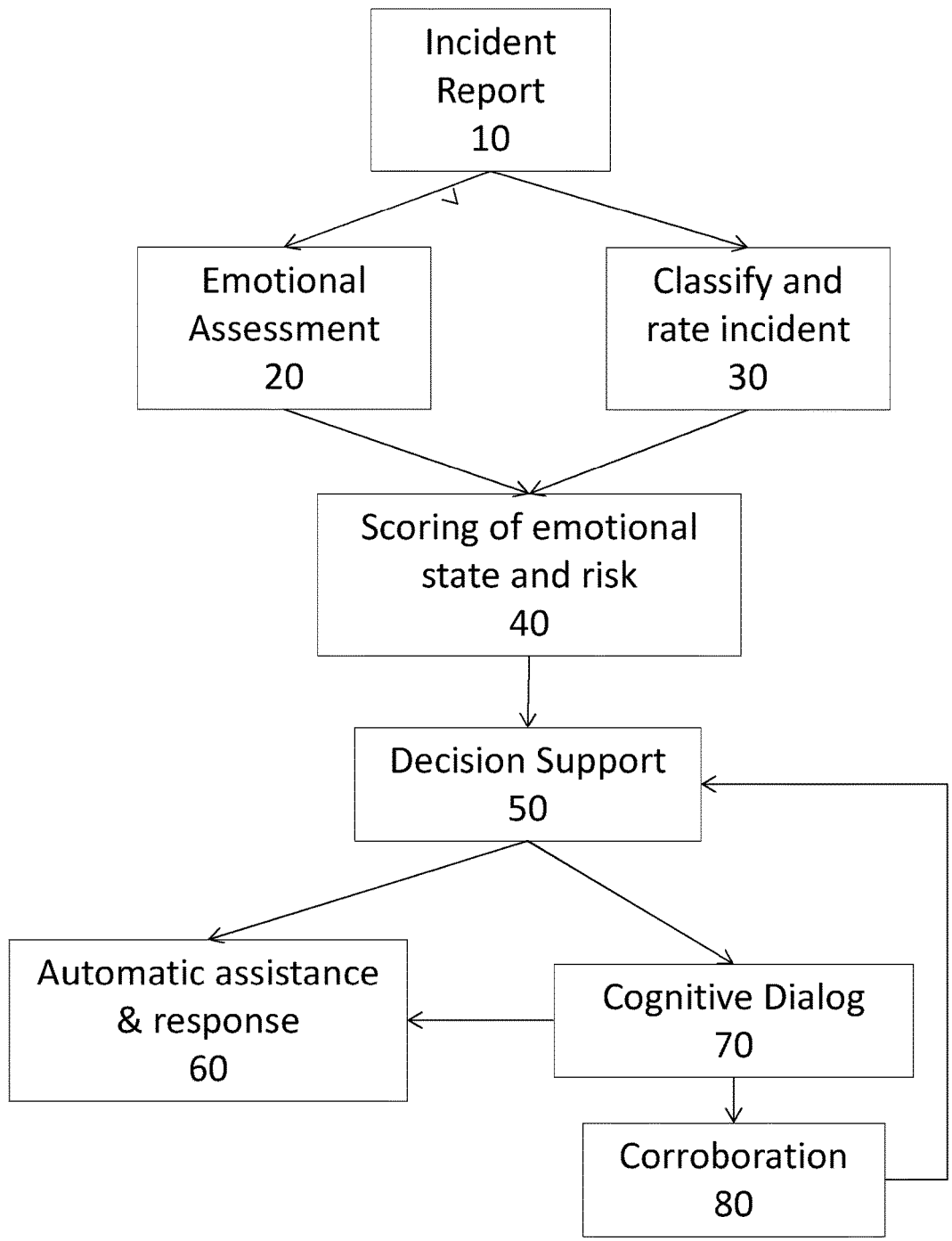
FIG. 1 provides a flow chart showing the processing of an incident report via a system according to an embodiment of the invention.

In aspects, the invention provides a system that reasons on the reporting person's emotional state and context to personalize situation awareness and to seek additional facts about the incident, wherein the system consists of client side and server side components. The term "client side" refers to components and/or methods directly interacting with the reporting person. The term "server side" refers to components and/or method occurring apart from the reporting person, typically by a remote server or the like. Throughout this specification and unless otherwise indicated, the term "user" and "reporting person" are used interchangeably.

As described in more detail herein, the client side framework collects data from one or multiple sensors while reporting an incident and monitors current affective and the cognitive situation of a person. Based on such information, in embodiments, the client side framework generates first order personalized situation awareness plans comprising advisory items (e.g., instructions, notifications, etc.) from a localized store of situation awareness events and protocols. In embodiments, the client side framework applies hybrid method (e.g., text analysis, voice analysis, and image/face analysis) progressively on sensor, voice, and interaction data obtained from the user device. In embodiments, the client side framework activates a cognitive dialog module based on the analysis of the data and estimated incident risk level, among other factor. In embodiments, the cognitive dialog module launches a Q&A session to collect ground truth about the incident through adaptive questions based, for example, on the emotional state of the user and initial validation result of the incident. The module may further send incident log, data from sensors, and first order awareness plans and/or advisory items to cloud-enabled backend for further analysis.

As described in more detail herein, in embodiments the server side framework clusters situation awareness advisories based on past similarity—e.g. of similarity of incident types of the same affective/cognitive situation, as well as other factors such as demographics and detected (and/or derived) incident properties. Upon reception of the incident information and current situation of the said subject, the server side framework validates the incident, for example using evidence gathered during Q&A and/or other techniques known for such validation. The framework may then generate aggregated situation awareness services based, for example, on the reported incident risk score, the user affective/cognitive situation, and past advisory data. Furthermore, based on previous Q&As session(s), additional contextualized questions may be generated. For each situation service, the server side framework may use intelligent heuristics to create one or more metaphors based, for example, on analytics on the user profile and incident context information of that advise from past similar situations. The framework may also generate a Journey Map by computing the incident coverage density in real-time and remotely updates the situation awareness dashboard on a user's mobile app.

The server side and client side frameworks work together in order to carry out the desired functions as described herein. A variety of components (also referred to as modules) are incorporated into the various frameworks, some of which will be described below. Certain components or aspects of components that are standard in the art (e.g., certain communication modules, visual output rendering modules, search modules, etc.) are not described herein for the sake of brevity but are within the skill of the ordinary artisan.

The user device is typically a mobile device, such as a mobile phone, tablet, or the like. Dedicated devices built specifically for the methods herein are also possible. In certain embodiments, the user device may be mobile yet fixed to another device—e.g., the user device may be built into a vehicle (i.e., not removable from the vehicle) and intended for use only by users while inside the vehicle. The user device contains a variety of software and hardware components described herein (e.g., Data Collection component, sensors, etc.). The user device must have a communications module that is configured to communicate data to the server side framework. Such communication may be via any suitable network, including cellular networks, WANs, WiFi, Bluetooth, and combinations thereof. A wide variety of communications modules using a wide variety of communications networks are known in the art and are likely to be later developed, and it is well within the skill in the art to determine whether any particular communication module is suitable for use in the user devices described herein. Such determination would be based, for example, on the type and amount of data intended to be communicated, availability of network resources in the area(s) most likely to be frequented by the user device, and the capabilities of the user device itself.

In embodiments, a data collection component is present on the user device and is used to automatically report incidents or to add information to manually reported incidents. The reporting may be carried out in multiple ways, such as text, voice, video, or image, or a combination thereof. The data collection component is also used to collect device-level sensory data in a non-invasive manner. For example, an incident reporting mobile application may be used, wherein the application provides a User Interface (UI) enabling a user to submit an incident report. The submission may be user initiated and may include a variety of information provided by the user (after prompting from the UI) such as incident characteristics, involved party or parties, the presence or absence of weapons, and the like. Alternatively, the submission may be automatically initiated based on sensor readings from on-board sensors, particularly where the sensors record events that are characteristic of known incidents. Alternatively or in addition, the data collection module may be initiated (or may be running in the background and initiate monitoring of an incident) based on user input, whether such input is intentional to cause the mobile app to begin an incident report (such as where the user selects an option to begin an incident report) or whether such input is non-intentional (e.g., the user sends out a social media message or an SMS or other message that indicates an incident is occurring or has occurred). For example, the mobile app is configured to recognize keywords (either in voice or SMS messages) that are indicative of an incident, and/or is configured to recognize certain key components in images (e.g., photos taken with the user device's onboard camera) that indicate the image is relevant to an incident (e.g., vehicles impacted, fires, etc.).

In embodiments, the data collection component is configured to extract and send relevant metadata automatically as reporting of the incident report is underway, or such metadata can be obtained after the incident report has been received by a central server (for example, the server can query the device for relevant metadata based on the incident report). Metadata may include time stamp, location coordinates, or the like.

In embodiments, the data collection component is part of an incident reporting mobile application (also referred to herein as an "mobile app") that is configured to begin collection of sensory data immediately after the mobile app is launched. This provides a level of security to the user, particularly where the user may not be capable of inputting data depending on the circumstances. Alternatively, or in addition, the mobile app may be configured to begin data collection upon instruction by the user. Alternatively, or in addition, the mobile app may be configured to begin data collection upon recognition of an occurrence that is indicative of an incident (e.g., keywords in an SMS, etc.). During normal operation, i.e., prior to the mobile app initiating or receiving instructions to begin data collection for an incident report, the mobile app may be in one of several modes. In a first mode the mobile app is entirely closed, i.e., the program is not in active execution, and no background processes of the mobile app are running on the user device. In this mode, the user must launch the mobile app in order for it to take any action. In a second mode, the mobile app is closed by has certain processes running in the background on the user device. For example, the app may be monitoring outgoing messages and data, photos taken by the onboard camera, and other operations of the user device in order to monitor for actions/activities that indicate an incident is occurring or has occurred. In a third mode, the mobile app is launched and is fully operational—providing a user interface, etc.—and remains passive until the user indicates (either intentionally or unintentionally) that an incident is occurring. The app may have, for example an option for the user to indicate to the app to begin an incident report. At times that the app is passively monitoring data and other activities by the user and user device, the data may be cached for an appropriate length of time for the mobile app to determine whether the data is indicative of an incident. When an incident (or data indicating an incident) is recognized, the cached data for an appropriate period of time can be aggregated into an incident report. Where no incident is recognized, cached data may be stored, transmitted to the server for analysis/storage/etc., and/or cleared from the memory of the user device in order to conserve resources.

The data collection module mediates all of the aspects of data collection (and, in embodiments, deletion) mentioned herein, as well as certain aspects of data analysis. For example, in embodiments, first order analysis of the available data may be carried out by the data collection module in order for the module to determine when an incident might be occurring and therefore when data recording should be increased and/or stored and/or aggregated for further transmission. Furthermore, other modules such as the reasoning module (described below) may be involved in first order analysis of the data—typically this occurs in real-time as the data collection module is collecting and monitoring data so that the app can be sure to be recording and aggregating data when an incident occurs.

In embodiments, the mobile app logs device level sensor data. Sensors include specialized sensors specifically installed on the device as well as generic sensors that are standard or optional components on modern mobile devices. Examples of sensors include a camera, accelerometer, microphone, light sensor (detecting visible light or otherwise), global positioning system (GPS) module, gyroscope, temperature sensor, touch characteristics, magnetometer, conductivity sensor, and the like. Collected sensor data are further aggregated, summarized (and compacted whenever necessary) using existing algorithms to further facilitate data storage, data transmission, advanced analytics, and other processes.

The data collected will depend on the sensors that are present and sending data to the mobile app. Examples of data include GPS coordinates or changes thereof, acceleration data of the mobile device, image data (e.g., videos or still images), light intensity data, audio data, temperature data, movement and orientation data of the mobile device, conductivity data (including, e.g., humidity data, etc.), and data pertaining to anything making physical contact with the user device (e.g., moisture, fingerprint scanner, etc.). Such data can be analyzed in a variety of ways including those described herein. For example, image data can be analyzed to identify objects within the image such as human faces or the like. A variety of image recognition and image analysis techniques are known and are suitable. Further details of image analysis and other data analysis used by the methods herein are provided herein.

In addition to local sensor data, the data collection module (or other modules of the systems herein, such as the server application or the like) may receive additional data from a variety of sources. Examples of such additional data (which may be referred to herein as situational data) may include any combination of the following: a weather report from a weather reporting source; a police report or activity log; a private security report or activity log; a mapping of previous known incidents and their locations; a social media message or aggregate of message from one or more social media platforms; a report from a news media source such as a TV or radio or Internet report; a physical location distribution of emergency responders (either instantaneous or averaged); and the like.

In embodiments, the mobile app aggregates and summarizes the collected data for a particular incident—i.e., the mobile app creates a file or files of incident data pertaining to a reported incident. When incident data pertain to a single incident, the incident data form an incident report about a reported incident.

The incident data may be locally compared with previous incidents or incident models in order for the mobile app as described in more detail herein. In embodiments, the aggregated and summarized data, along with any models or action plans determined by the mobile app, may be transmitted to the server side framework via the communications module of the user device. Once the incident data is transmitted to the server, it can be said that the server is in reception of an incident report, and that the user becomes a reporting person. The incident report may be a single transmission of a collection of data (bulk reporting), or, alternatively, may involve receipt by the server of incident data over a period of time and several transmissions (trickle reporting).

The mobile app (or in some embodiments, the server side application, or a combination thereof) comprises an incident classification module that classifies the reported incident based on all or portions of the collected data. In embodiments, classification involves implementing heuristic and learning based approaches to characterize data pertaining to reported incidents. Based on the data types (text, voice, and/or image/video) the module applies various techniques (e.g. unsupervised approaches) to automatically extract keywords from incident transcripts, keywords from other sources of text data, visual clues or cues from image data, or other key data items from other forms of data. Such extraction enables the module to apply the appropriate algorithm to determine the incident properties (e.g., WHAT, WHERE, WHEN, WHO, HOW, WHY, as applied to the incident) using known incident detection and extraction technique (e.g., from Text, Image, Video, and Audio, etc.). Then, based on values of the incident properties, determine the type of the incident (e.g., robbery, accident, etc.). The mobile app may store a variety of common types of incidents, and may select the most relevant incident type from such stored types, or may characterize the incident as unknown if the incident properties are sufficiently different from known patterns. The app may apply threshold values to the various incident properties in order to select an overall characterization of the incident type.

The mobile app further comprises a reasoning module (also referred to as a mobile reasoning module). The reasoning module employs lightweight deep learning and/or edge computing capabilities to algorithmically determine the emotional state and context of the user. Input for the reasoning module includes summarized sensors data (e.g. camera, microphone, heat, heartbeat), incident description (in the form of text or voice) or incident type (from the incident classification module), and other additional data, to determine the emotional state of the user. This data is referred to herein as emotional data. Furthermore, non-incident related emotional patterns may be used to further understand the daily or historic emotion pattern of the user using known techniques and correlate with the emotion caused by the incident. Furthermore, for context determination, the module uses sensor data such as microphone, light sensor, GPS, gyroscope, body heat sensor, microphone, timestamp, etc and other data sources.

In embodiments, the reasoning module implements a hybrid technique, which may comprise any of the following: a face detection module that determines the facial expression of the user and maps the data into an affect state (e.g. sorrow, fear, anger, disgust, etc.); a voice/speech analytics module that detects emotion (e.g. anxious, calm, etc., such as emotion that manifests in increased amplitude or frequency of the user's voice) from the speech of the user and maps the data into an affect state; a text analytics module that detects emotions from text of incident description and/or dialog interaction or application interaction data; and an aggregator module configured to combine these measurements with prior emotional patterns as well as data from users with similar emotion conditions or characteristics belonging to similar category or characteristics of incidents. Emotional data is analyzed by the mobile app and/or the server application, which applications are searching for recognizable patterns in the data that give an indication of the emotional state of the user. Such patterns may be developed from models and/or based on cognitive (machine learning) analysis of past events and outcomes. For example, the application algorithms can recognize keywords in text/audio messages that, when coupled with other data such as an increased heart rate or an increase in the frequency or amplitude of speech, indicate a high-stress emotional state of the user.

In embodiments, the mobile app comprises an advisory module that generates first order situation awareness advisory based on the output of the reasoning module. The advisory, in embodiments, launches the cognitive dialog module (described in more detail below) in order to obtain more information about the incident and situation, as well as to interact with the user (e.g., to reduce the stress level of the user via appropriate interaction). Alternatively, or in addition, the advisory takes other actions such as notifying emergency responders or the like. The advisory module is a locally stored module so that connectivity of the user device to a network is not required for this first order aid to the user.

In embodiments, from the mobile-based reasoning module, the computed emotional state, detected incident characteristics, and other relevant data are transmitted to the server (i.e., cloud backend) for further analysis. Thus, in embodiments, the server side framework also comprises a reasoning module (also referred to as a server reasoning module). Upon receiving the emotional state, detected incident characteristics, and other data that may be sent, the mobile app may further monitor the emotional state of the user, and additional analysis may be carried out on the further monitoring, in order to assess the validity of the incident, as well as compute the severity or risk level of the user. The server reasoning module may apply advanced algorithms (e.g. similarity, aggregation and summarization techniques) to fetch reported similar incidents. Even in the absence of further data from the mobile app, the server reasoning module may further assess the reported information to determine severity of the incident and compute the incident risk score, compute the incident coverage area, etc. In embodiments, the computation results from the server reasoning module may be displayed on emergency response dashboard side-by-side with the incident summarized view for expert review and response. Further details of output and actions taken by the system are provided herein.

In embodiments, the system (e.g., the user device or the server side) comprises a decision module. The decision module may take the results of the reasoning module (emotional state, risk level, incident characteristics, context information, etc.), advisory module, and other information to decide which service to activate from a set of capabilities available (particularly, the capabilities available in the "Cognitive Dialog"). In embodiments, the decision module can implement rule-based logics, learning-based techniques, or agent-based techniques to decide the type of services to activate dynamically. In embodiments, the context information provides domain knowledge for the decision engine, wherein rules can be changed or learned when the context and hypothesis changes over time.

Where the server side framework receives data from a user device, analyses such data, and determines a response, the server may transmit an initiation dialog sequence to the user device. The initiation dialog sequence contains and activates a response plan (also referred to as an "appropriate response") that may include initiation of the cognitive dialog module (discussed below) as well as other actions (e.g., causing an alarm to sound on the user device, or notifying an emergency responder, etc.). The initiation dialog sequence is received by the user device and is executed by the mobile app. The initiation dialog sequence may be based entirely on the incident report from the user device or may include additional data such as those data and sources described herein. Additional information may inform the initiation dialog sequence, such as the identity of the reporting person (particularly where, e.g., the reporting person is an emergency responder). The initiation dialog sequence is a set of machine readable instructions that is received by the user device and, in embodiments, is configured for automatic execution by the user device. In alternative embodiments, the initiation dialog sequence is configured to prompt the user (via a pop-up message or other change to the user interface of the mobile application) to initiate all or any specific part of the machine readable instructions. For example, the prompt may display on the user device display (or via a purely audible prompt) a series of options or suggested courses of action, and request that the user select the options/suggestions that the user wishes to execute or have automatically executed by the user device. The initiation dialog sequence, when received by the user device and implemented either automatically or via user input, has any of the following results: a change of the user interface on the user device, such as to initiate a Q&A session with the user (to obtain more information about the incident, or to ascertain the emotional status of the user, etc.) or to instruct the user with instructions transmitted via the user interface; a change of the user interface to issue an alarm, alert, or other notification (either in visual form, audible form, or both) to assist the user in dealing with the incident; initiate one or more sensors (including any sensor mentioned herein, such as temperature, gyroscopic, vibration, GPS, camera, etc.) on the user device in order to obtain further information of the incident or of the emotional state of the user; automatic notification of an emergency responder or another entity (police, private security, etc.) of the incident, including the incident type, characteristics of the incident, and/or emotional status of the reporting person; and the like.

The systems herein provide a variety of interactive services referred to collectively as "cognitive dialog," that can interact with the user in order to, for example, refine the knowledge of the system with respect to a specific reported incident, refine the knowledge of the system with respect to incidents generally, refine the advice given to a user in a specific situation, refine the models used to determine advice based on incident data, and the like. In embodiments cognitive dialog takes the form of a cognitive dialog module in the mobile app, at the server side, or a combination thereof, and includes services such as Situation Awareness Dialog, and Adaptive Q&A Services (Q&A Dialog module), among other possibilities. For example, if the severity level of the user's emotion exceeds a baseline threshold, the cognitive dialog module intelligently initiates cognitive situation awareness dialog that is tailored to the user's specific context. The baseline threshold can further be correlated with the user's health historic data and/or other relevant data. The user interacts with these services through text and/or audio while the system continuously monitors the emotional level of the user and adjusts services, dialog, and recommendations accordingly.

For example, the Situation Awareness Dialog consists of a suite of cognitive services to advise the user: Well-being Advisory, Safety Advisory, Strategy Advisory (e.g. how to best avoid risky situation based on real-time incident feed), etc. For example, the Strategy Advisory Service generates a virtual-walk through (referred to herein as a Journey Map) for the user, wherein the Journey Map is generated using computed incident coverage density in real-time and is useful to help the user avoid incidents. Furthermore, using intelligent heuristics the system can create one or more metaphors based on analytics on the user (including, e.g., user profiled that consist of the user preference and language) and incident context information from past similar situations. Furthermore, the user Journey Map or a dashboard for the map can be remotely updated wherein incident characteristics and context are shown.

In embodiments, and based on the context, incident characteristics, and additional information from the server-side, the cognitive dialog module launches a Q&A dialog module to infer additional information about the incident from the user. This is part of a further interaction between the user and the mobile app, such further interaction designed to obtain additional relevant information and/or assist the user. In embodiments, the further interaction is selected from an audio interaction, a text interaction, a visual interaction, a gesture interaction, and a combination thereof. For example, the Q&A dialog module generates questions and initiates a dialog session (text or voice) based on the user's emotional level and context. Responses are solicited from the user, captured by the user device, and analysed (e.g., converted to text, analysed for keywords, etc.) by the mobile app and/or server. Using the user interaction and response data, the user device and server system monitors the emotional reactivity of the user in a non-intrusive manner and is able to adjust questions appropriately.

In embodiments, the user interacts with the cognitive dialog module and the services provided by the module through text and/or audio while the system continuously monitors the emotional level and/or reactivity of the user and adjusts services (e.g., questions in a Q&A dialog, service provider requests, etc.) accordingly. This interaction is also part of the further interaction mentioned above. Such monitoring and adjusting of the system output can continue throughout the duration of the incident and, if desired, for any suitable length of time after the incident. In embodiments, monitoring is carried out in a non-intrusive manner so as not to increase the stress level of the user. In embodiments, the cognitive dialog module includes a natural language processing (NLP) and visual analytics software utility configured to analyze input from the reporting person (e.g. text, voice, image/video) and determine a response based on the input. The same NLP and visual analytics software may be employed by the reasoning module or other modules for analyzing the data collected from the user. The further interaction can be used to iteratively refine the dialog between the user and the cognitive dialog module.

In embodiments, a metaphor generator translates the generated services from the cognitive dialog module into user consumable way based on the user profile (e.g. language preference, style, output method—text, graphics, voice, etc.). In embodiments, the metaphor generator can read certain user setting for his/her mobile in order to obtain such preferences. For example, in regions where multiple languages are spoken, information and other aspects can get loss in translations. A user may speak multiple languages (e.g., in Kenya a person can speak Swahili, Kikuyu, English) and use them differently depending the situation. Users can set their preferred languages in the application. The metaphor generator uses advanced (known and future developed) natural language processing and cognitive algorithms to process the content of voice and text that are pushed through the application, and generates a response in the same language used to communicate back to users. The generator also takes in to consideration user cohort based on past historical data. Other capabilities such as visual analytic, deep learning and neural net can be used to deeply interpret the interaction (e.g., voice, gesture, command) of the user. A metaphor can be a picture, an avatar, etc. that can best match with the user cohort and context.

In embodiments, the system handles online-offline transitions as needed. For example, where the server is unavailable, the mobile app may rely entirely on locally stored models and algorithms to determine suitable responses. Furthermore, relevant data is maintained locally, and the mobile app sends event data and final models to the cloud when network is available.

In embodiments, the mobile app deletes data from the local storage as and when needed (e.g. to address resource constraints). Such deletion can be initiated by the user or set for automatic execution.

Launching the cognitive dialog module is an action taken by the mobile app in response to an incident. As mentioned herein with respect to the data collection module, launching the cognitive dialog module may be initiated in a number of ways. For example, the cognitive dialog module may be launched by the mobile app automatically when the app (i.e., the data collection module or another module) recognizes that an incident is occurring or has occurred. Alternatively, or in addition the cognitive dialog module may be launched when the user actively initiates an incident report.

In addition to activating the cognitive dialog module, the mobile app or server app may produce any of a variety of outputs. In embodiments, and based on the identified incident, the mobile app automatically initiates notification of emergency responders (fire, police, ambulance, private security, etc.), providing the GPS coordinates, timestamp, and incident characteristics (e.g., type of incident, number of people involved, and/or any other relevant data) in such notification. The app may further automatically cause a notification to appear on a monitor, such as a police or private security monitor with the intention of causing a human monitor to take action (e.g., notify police or other emergency responders, dispatch emergency responders, etc.). Such notification may also comprise GPS coordinates, timestamp, and incident characteristics (e.g., type of incident, number of people involved, and/or any other relevant data). The alert to an emergency responder can be a visual alert such as a notification on a monitor, an audio alert such as an alarm, any other appropriate form of alert, or any combination thereof.

In embodiments, there is provided a method comprising: receiving, by a system, an incident report from a user device, the incident report pertaining to an incident involving a target; receiving by the system an emotional data pertaining to a reporting person using the user device; processing the emotional data to determine an emotional status of the reporting person; processing the incident report to determine an incident type, incident category, and incident characteristic; and transmitting an initiation dialog sequence to the user device, the initiation dialog sequence configured to initiate on the user device a cognitive dialog module that prompts a further interaction with the reporting person, wherein the initiation dialog sequence is based at least in part on the emotional status of the reporting person and at least in part on the incident characteristics.

In embodiments is a method comprising: processing an incident report received from a user device, the incident report pertaining to an incident involving a target; processing an emotional data received from the user device, the emotional data pertaining to a reporting person; and initiating on the user device a cognitive dialog module that prompts a further interaction with the reporting person, the further interaction based on the emotional data and incident report.

In embodiments is a system with one or more sensors detecting an emotional state of user (e.g., video camera, microphone, or the like as described herein), an analysis module to determine emotional state of the user, a rule engine to determine one or more appropriate response measures based on the emotional state of the user, and an output module to prepare machine readable instructions that cause the user device to execute the appropriate response measures, wherein the system is configured to execute the appropriate response measures via the machine readable instructions, including reconfiguration of the user device (e.g., the display, speaker, or other output component of the user device are reconfigured to display instructions, alerts, notices, an interactive Q&A session, disconnection from the network or other communication system, or the like, the speaker is reconfigured to sound an alarm, initiate an interactive Q&A session, or the like, etc.) based on appropriate response measures. In embodiments, the appropriate response measures further include contacting emergency services via a network or radio or other communication system by the user device or by a server.

The systems and methods here are suitable for a variety of incident types, such as vehicle accidents or other accidents, fires, shootings, drownings, animal attacks, terrorist attacks, or the like. As mentioned, part of the disclosed processes involves characterizing the type of incident based on the data available from the data collection module and other sources of data. Even where the incident is of a type that is not recognized, or wherein the system mischaracterizes the incident, the system's dialog and the further interactions can help to refine the response plan and to aid the user.

The figures provided herein are provided merely as examples to show architectures and interconnectivity of components and modules of the various systems described herein. Like numbers across the various figures are intended to indicate like components. The use of arrows is meant only to show possible embodiments of connections and data flow, but is not intended to be limiting—e.g., data may flow between components in both directions even where a single direction arrow is shown (thus, multidirectional arrows are used only for emphasis and not limitation of the connections lacking such arrows).

With reference to FIG. 1, there is shown the general overview in the form of a flow chart of the processing of an incident report via a system according to an embodiment of the invention. Incident report 10 involves an emotional assessment 20 of the reporting person, as well as classification and rating of the incident 30 based on incident type(s) and other data received by the system. The emotional state of the reporting person and the risk of the incident 40 are based on the determined incident type as well as any other relevant data. Modules within the system (either locally on the user device, or at the server, or both) are configured to assign a risk score and further to determine the emotional state of the user. Based on these determinations, decision support 50 is initiated and includes generation of an automatic response plan and assistance 60, and a cognitive dialog 70 with the user. The cognitive dialog involves corroboration 80, meaning that the incident is further characterized by the receipt of further data from the user. Such further characterization is used in an iterative process to determine further interaction with the user.

Figure 2:
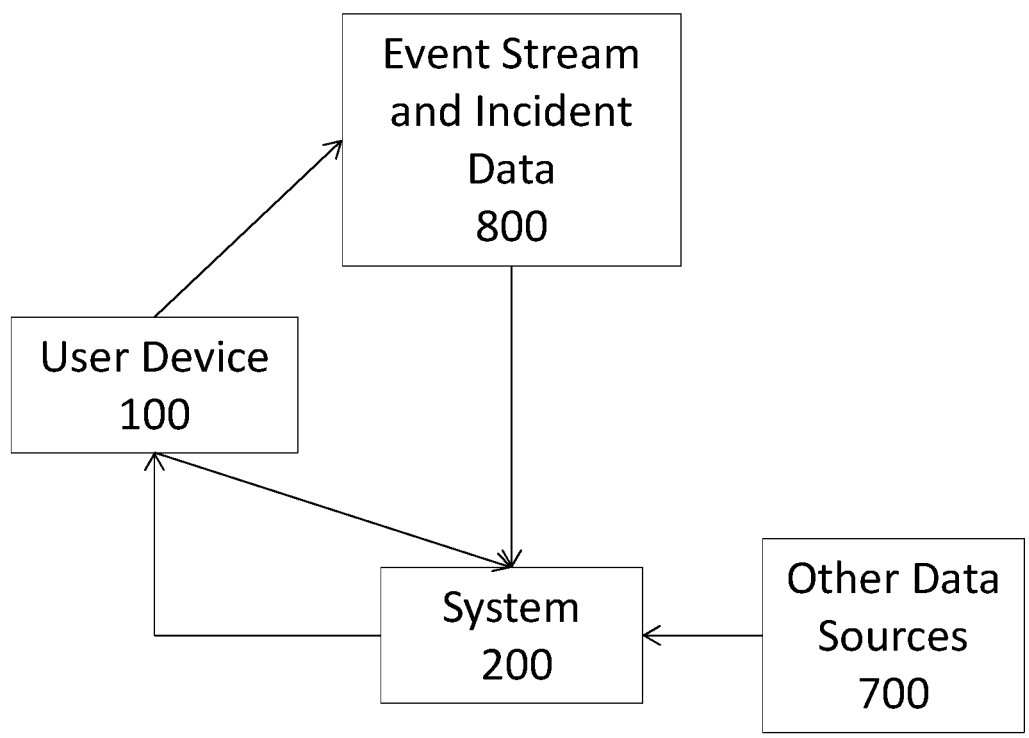
FIG. 2 provides a flow chart showing interaction of a user device with a system according to an embodiment of the invention.

With reference to FIG. 2, there is provided a flow chart showing interaction of a user device with a system according to an embodiment of the invention. User device 100 interacts with system 200 as well as an event stream and incident data 800. Using the event stream (i.e., user interactions and sensed data), incident data (i.e. the actual incident report) 800 and incident models (that have been built using historical incident data) can be used by our custom software utilities (embedded in the system) 200 to refine response plans. Furthermore, other data sources 700 are linked to system 200 such that the system can further refine response plans based on the additional data. The response plans will eventually be used to fine-tune and update the analytics models for future use.

Figure 3:
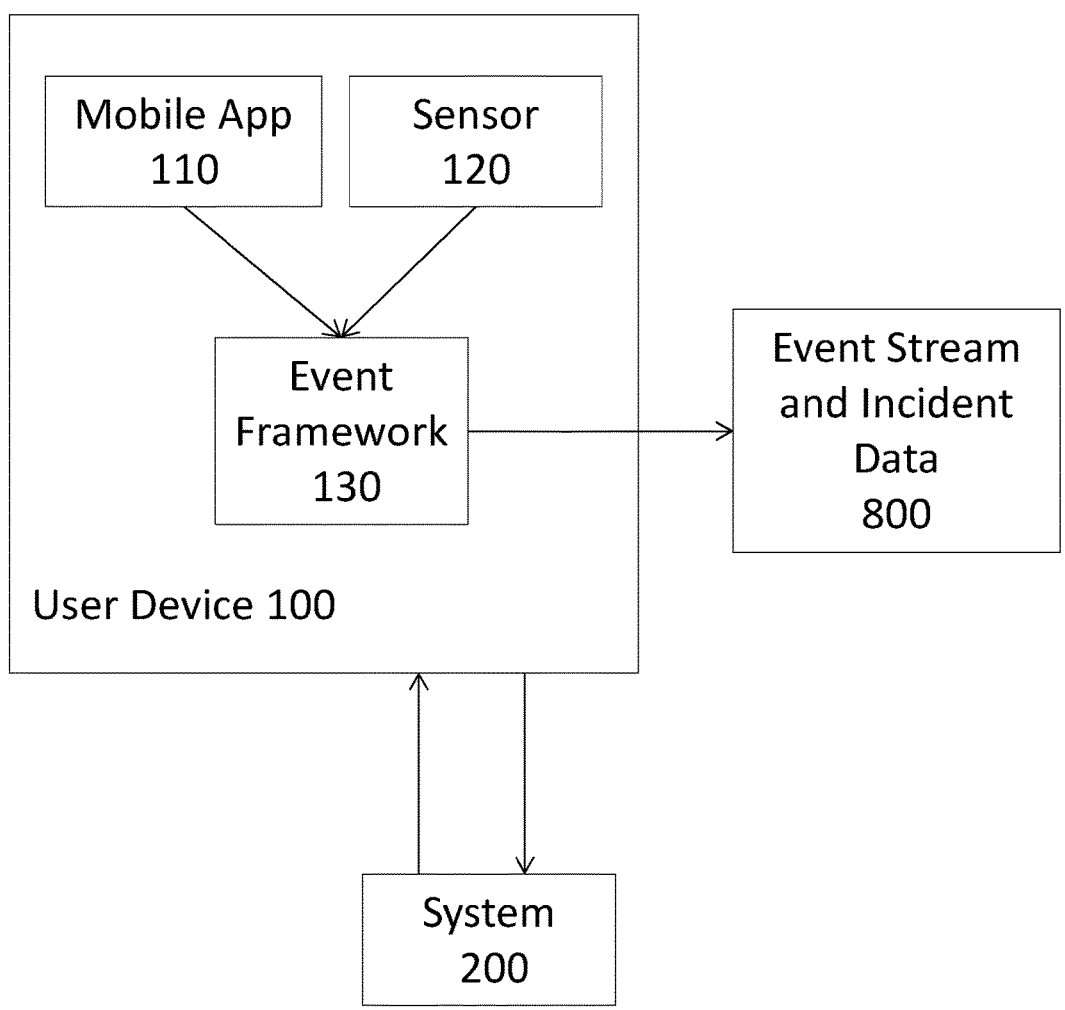
FIG. 3 provides a flow chart showing components of a user device according to an embodiment of the invention.

With reference to FIG. 3 provides a flow chart showing more detailed components of user device 100 according to an embodiment of the invention. User device 100 comprises mobile app 110, sensor 120 (multiple sensors may be present, but are not shown in the figure), and event framework 130. The event framework is a data streaming engine that residence on the client side to instrument and collect user interactions (and activities) and sensory data from our incident reporting mobile application used by the user. The sensory data are collected by monitoring sensors such as accelerometer, global positioning system (GPS) receiver, face detection, camera, speaker, and other sensors.

User device 100 communicates with system 200 and with event stream and incident data 800 as mentioned previously.

Figure 4:
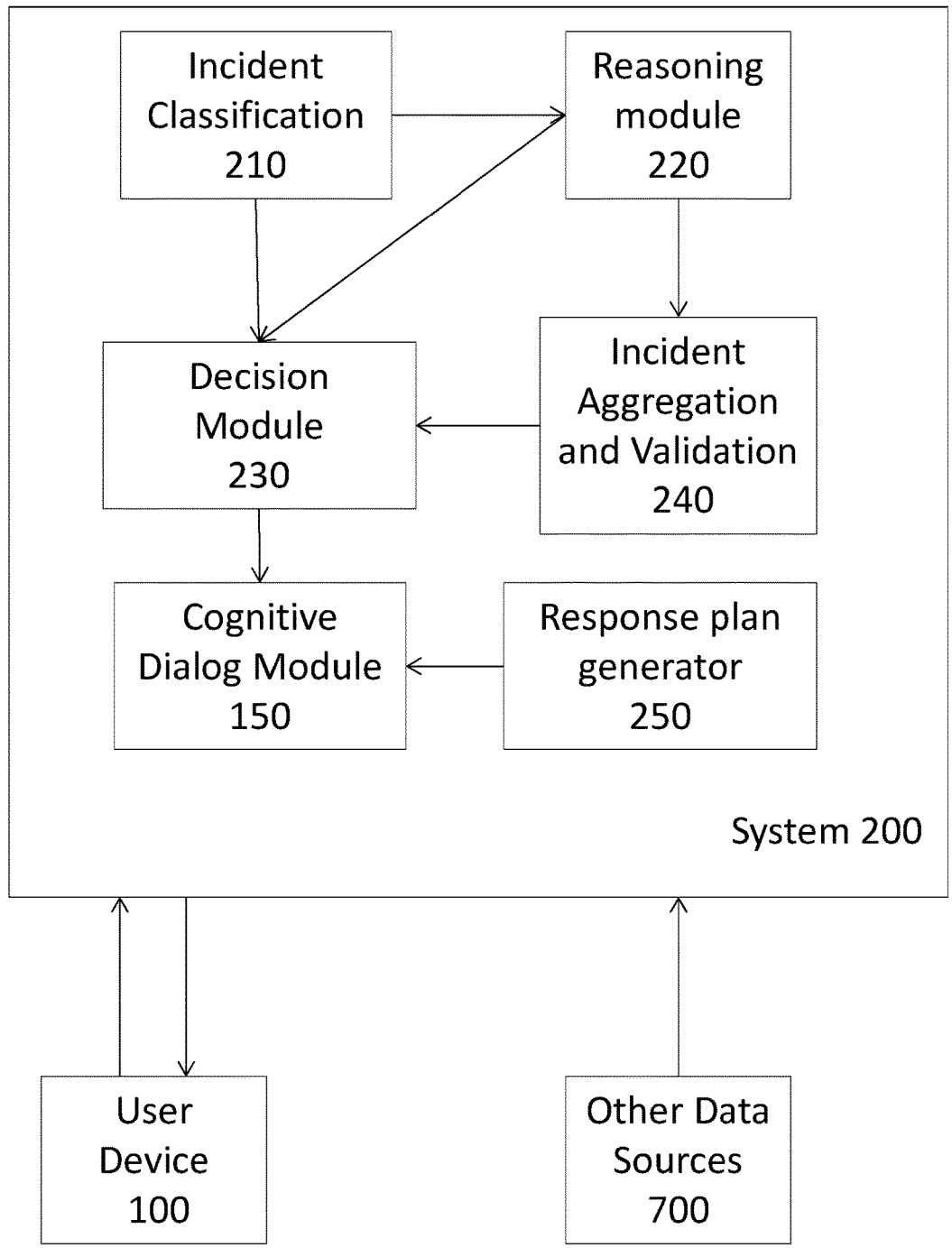
FIG. 4 provides a flow chart showing components of a system according to an embodiment of the invention.

With reference to FIG. 4 provides a flow chart showing more detail about some of the components of system 200 according to an embodiment of the invention. A data collection module (not shown) passes data to incident classification 210, which determines the incident type based on characteristics and patterns in the data. Reasoning module 220 analyses the data pertaining to the user to determine an emotional status of the user. The data is further passed to incident aggregation and validation 240, which aggregates data about the user, incident, and situation/context. The output of the various modules are used by decision module 230 as well as response plan generator 250 in order to launch cognitive dialog module 150. The cognitive dialog module 150 interacts with the user to gain more details as needed, and as described herein. System 200 communicates with user device 100 and other data sources 700 as described previously.

Figure 5:
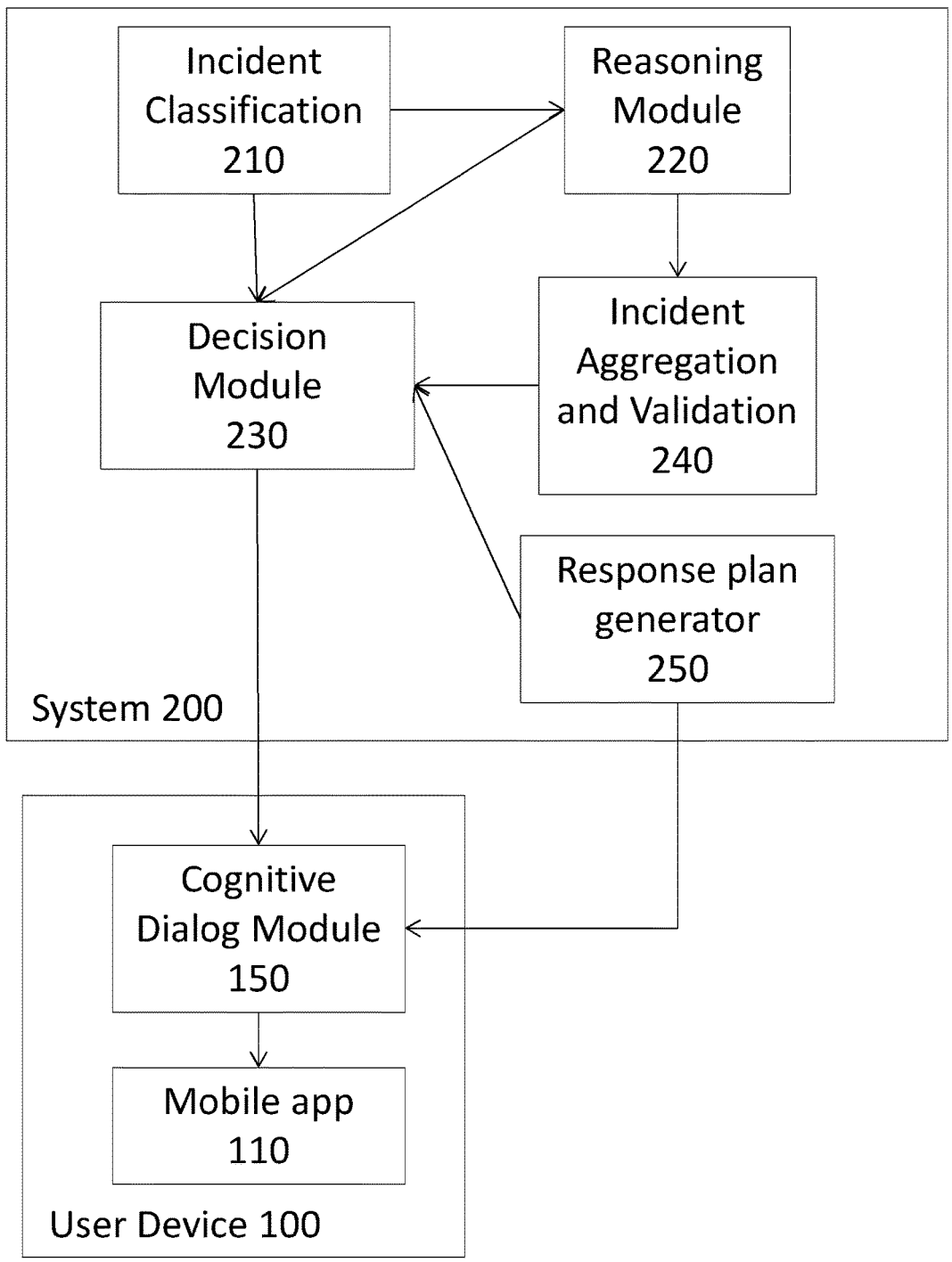
FIG. 5 provides a flow chart showing components of a system according to an embodiment of the invention.

With reference to FIG. 5 provides a flow chart showing an alternative configuration of the components of system 200, particularly one in which cognitive dialog module 150 is local on user device 100. This configuration is convenient because it allows cognitive dialog module 150 to interact with the mobile app 110 even in the absence of a communication channel between user device 100 and system 200 (e.g., where no Internet connection is available).

Figure 6:
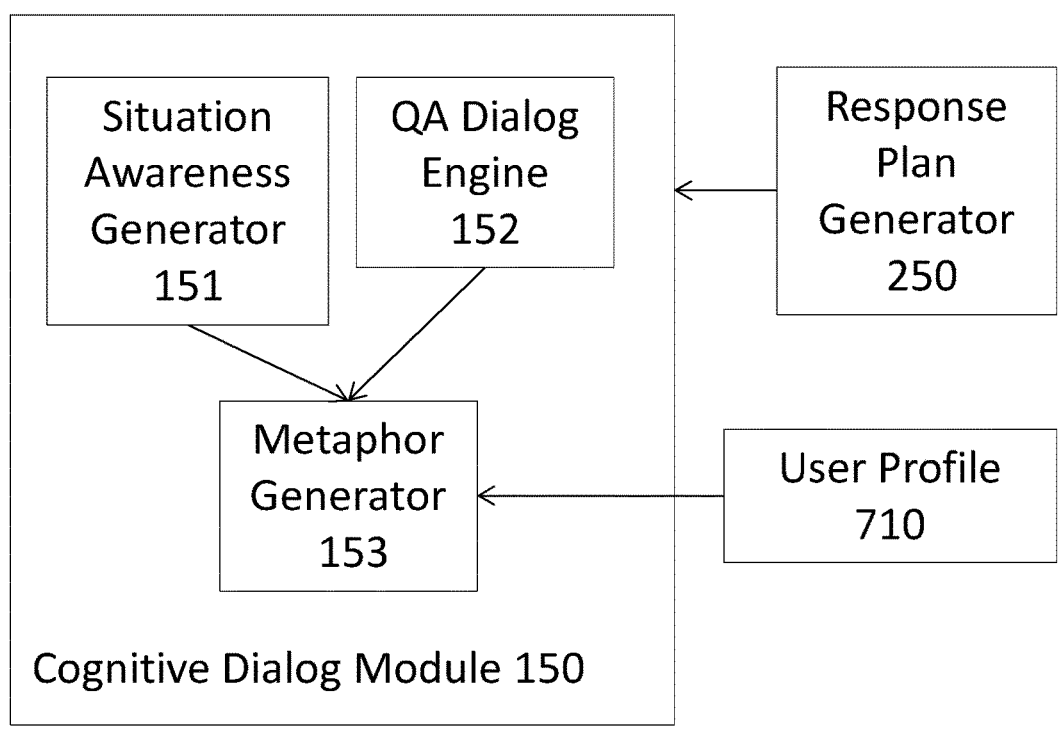
FIG. 6 provides a flow chart showing components of a cognitive dialog module according to an embodiment of the invention.

With reference to FIG. 6 provides a flow chart showing details of certain components of a cognitive dialog module 150 according to an embodiment of the invention. Situation awareness generator 151, and QA dialog engine 152 provide input for metaphor generator 153, which also uses user profile 710 in order to process and develop suitable models and metaphors.

In embodiments, a "system" herein refers specifically to the server and the server side framework (i.e., including the hardware and software associated with the server side). In other embodiments, as will be apparent from the context, a "system" refers to the server side framework and the client side framework (i.e., including the user device and the software thereon). Throughout this disclosure, the invention includes systems that are suitable for carrying out the disclosed methods. Such systems include all necessary hardware and software components, even where certain components may not be mentioned specifically herein for the sake of brevity or otherwise. For example, such systems include necessary processor(s), memory or memories (volatile or non-volatile, coupled to the processor(s)), instruction sets, and/or communications modules (coupled to the processor(s) and memory or memories) as appropriate and as will be apparent to one of ordinary skill.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

Example 1

In an example scenario: A person in a taxi, late at night, is going home and sees a bad accident. The person uses his mobile application to report the incident.

Method of report: text

Emotional Assessment: Measure the sensory parameters shown in the following table and assign a score.

TABLE 1

| Touch | See | Hear | Smell (Applicable if Cognitive Dialog (CD) activated) | Summary |
|---|---|---|---|---|
| Typing rate: 68 wpm (fast); | Eye movement: medium velocity | Breathing rate: N/A | | |
| Heartbeat/sec: 98 (med) | Light measurement: 0.0001 LUX | Voice pitch and frequency analysis: N/A | | |
| Phone movement: steady | | External sounds: car engine running, car horns, etc. | | |
| Body heat: 99.4° F. | | | | |

Further analysis of the data and situation is carried out as shown in the following table.

TABLE 2

| Incident | Risk level | Emotional State | Response output |
|---|---|---|---|
| Unconfirmed car accident | Individual: Medium Surrounding population: low | Agitated | 1. Initiate Cognitive Dialog Module[1] 2. Corroborate Incident[2] |

[1]Based on the reported incident, ask a series of questions to get additional information (e.g. do you smell gasoline, did you see noticeable injuries on the victim)
[2]Alert users within the surrounding areas of incident and have them verify incident (can provide additional information via text, voice, image etc.); system will pull key words from incident corroborate with social media outlet and additional information used in the incident analysis Example 2

In an example scenario, there is an Incident Report received at 2300 hours as follows: "@ ABC Road. A car hit a light pole. I think a person is still in the car. This is terrible!" The incident report is received via SMS. The tables below show the analysis and examples of further data that can be obtained and used in generating a response.

TABLE 3

|  | Text (NLP) | Image (Image Analytics) | Audio (Audio Transcription) | Video (Video analytics) |
|---|---|---|---|---|
| What | Car accident |  |  |  |
| Where | Road ABC |  |  |  |
| When | 2300 hrs |  |  |  |
| Who | One victim |  |  |  |
| How |  |  |  |  |
| Why |  |  |  |  |

TABLE 4

|  | Incident Reporter | Population Density impact | Residential impact | Business impact | First responder times |
|---|---|---|---|---|---|
| Low |  | X | X | X |  |
| Medium | X |  |  |  | X |
| High |  |  |  |  |  |

The invention claimed is:

1. A method comprising:
   receiving an incident report from a user device, the incident report pertaining to an incident involving a target;
   obtaining, from at least one sensor of the user device, emotional data pertaining to a reporting person using the user device, wherein the emotional data includes at least one of heat, heartbeat, conductivity, text, speech, image, and video data;
   processing the emotional data to determine an emotional status of the reporting person, wherein processing the emotional data includes at least one of face detection, voice/speech analytics, and text analytics;
   processing the incident report to determine an incident type, incident category, and incident characteristic; and
   transmitting an initiation dialog sequence to the user device, the initiation dialog sequence configured to initiate on the user device a cognitive dialog module that prompts a further interaction with the reporting person, wherein the further interaction is based at least in part on the emotional status of the reporting person and at least in part on the incident characteristics.

2. The method of claim 1, further comprising initiating a visible or audible alert on an emergency service provider device based at least in part on the processed incident report and at least in part on the emotional data.

3. The method of claim 1, further comprising receiving, by a system discrete from the user device, situation data pertaining to the incident, wherein the system provides the initiation dialog sequence in response to the situation data.

4. The method of claim 1, further comprising receiving, by a system discrete from the user device, situation data pertaining to the incident, wherein the situation data is from a source selected from the user device and an external source.

5. The method of claim 1, wherein the further interaction is selected from an audio interaction, a text interaction, a visual interaction, a gesture interaction, and a combination thereof.

6. The method of claim 1, wherein the further interaction is further based on identity data of the reporting person.

7. The method of claim 1, further comprising initiating the cognitive dialog module on the user device based on the initiation dialog sequence or based on an interaction pattern of the reporting person.

8. The method of claim 1, further comprising:
   initiating the cognitive dialog module on the user device based on the initiation dialog sequence;
   receiving, by the cognitive dialog module, additional data selected from further emotional data pertaining to the reporting person and situation data; and
   customizing the further interaction based on the additional data.

9. The method of claim 1, wherein the further interaction comprises communication of data and instructions with a system discrete from the user device to further customize the further interaction.

10. A system comprising:
    a processor; and
    a memory coupled to the processor, the memory configured to store program instructions for instructing the processor to carry out the method of claim 1.

11. The system of claim 10, wherein the system comprises:
    a reasoning module; and
    an advisory module.

12. The system of claim 10, wherein the system comprises a communications module for communicating via a network with a cognitive dialog module on a user device.

13. The system of claim 10, wherein the system comprises a communications module for communicating via a network with a cognitive dialog module on a user device, the cognitive dialog module comprising natural language processing (NLP) and visual analytics software utility configured to analyze input from the reporting person and determine a response based on the input.

14. The system of claim 10, wherein the system comprises a communications module for communicating via a network with a cognitive dialog module on a user device, the cognitive dialog module comprising a linguistics analyzer component configured to process the language, dialect, or slang of the reporting person.

15. A user device comprising:
    at least one sensor collecting emotional data from a reporting person, wherein the emotional data includes at least one of heat, heartbeat, text, speech, image, and video data;
    a reasoning module implementing at least one of face detection, voice/speech analytics, and text analytics to infer an emotional status of the reporting person;
    a communications module communicating the emotional data, the emotional status, and an incident report to a server; and
    a cognitive dialog module implementing a metaphor generator to prompt a further interaction with the reporting person.

16. The user device of claim 15, wherein the cognitive dialog module implements the metaphor generator in response to an initiation dialog sequence received from the server via the communications module.

17. The user device of claim 15, wherein the further interaction is selected from an audio interaction, a text interaction, a visual interaction, a gesture interaction, and a combination thereof.

18. The user device of claim 15, wherein the further interaction is selected from a situation awareness dialog and a question and answer dialog.

19. The user device of claim 15, wherein the cognitive dialog module implements the metaphor generator in response to an interaction pattern of the reporting person.

20. The user device of claim 15, wherein the metaphor generator takes into consideration user cohort based on historical data.

\* \* \* \* \*